(12) United States Patent
Duglio et al.

(10) Patent No.: US 10,802,035 B2
(45) Date of Patent: Oct. 13, 2020

(54) METHOD AND DEVICE FOR MEASURING AND CONTROLLING THE DOSAGE OF SMALL QUANTITIES OF FLUID BY MEANS OF A RESONATING NEEDLE, AND RESONATING NEEDLE SUITABLE FOR THIS PURPOSE

(71) Applicant: TECHNOGENETICS HOLDINGS S.R.L., Milan (IT)

(72) Inventors: Franco Duglio, Vizzolo Predabissi (IT); Adolfo Cavallari, Caserta (IT); Luca Melillo, Lioni (IT)

(73) Assignee: Technogenetics Holdings S.R.L., Milan (IT)

( * ) Notice: Subject to any disclaimer, the term of this patent is extended or adjusted under 35 U.S.C. 154(b) by 408 days.

(21) Appl. No.: 14/437,973

(22) PCT Filed: Oct. 24, 2013

(86) PCT No.: PCT/IB2013/059618
§ 371 (c)(1),
(2) Date: Apr. 23, 2015

(87) PCT Pub. No.: WO2014/064641
PCT Pub. Date: May 1, 2014

(65) Prior Publication Data
US 2015/0293137 A1 Oct. 15, 2015

(30) Foreign Application Priority Data
Oct. 24, 2012 (IT) .............................. MI2012A1803

(51) Int. Cl.
*G01N 35/10* (2006.01)
*G01F 1/66* (2006.01)

(52) U.S. Cl.
CPC ......... *G01N 35/1016* (2013.01); *G01F 1/662* (2013.01); *B01L 2200/143* (2013.01);
(Continued)

(58) Field of Classification Search
CPC .......... B01L 3/02; B01L 3/021; B01L 3/0268; B01L 3/022; B01L 3/0234; B01L 2400/0433; B01L 2400/0439
See application file for complete search history.

(56) References Cited

U.S. PATENT DOCUMENTS 6,296,811 B1 * 10/2001 Sasaki .................. B01L 3/0268
310/326
6,367,925 B1 * 4/2002 Chen ..................... B01L 3/0268
347/109

(Continued)

FOREIGN PATENT DOCUMENTS

| CN | 1585922 A | 2/2005 |
|----|-----------|--------|
| JP | 2005-265689 A | 9/2005 |
| WO | 2003/042805 A1 | 5/2003 |

OTHER PUBLICATIONS

International Search Report dated Apr. 25, 2014, issued in PCT Application No. PCT/IB2013/059618, filed Oct. 24, 2013.
(Continued)

*Primary Examiner* — Brian R Gordon
(74) *Attorney, Agent, or Firm* — Workman Nydegger

(57) ABSTRACT

A resonating needle is adapted to be used in a device for measuring and controlling the dosage of a small quantity of fluid, includes: a needle (1) adapted to contain said small quantity of fluid; a resonating element of the piezoelectric type (2), coupled to said needle and adapted to be energized in order to detect variations of oscillation parameters of the needle and of the resonating element for the purpose of determining the dosage measurement and control.

5 Claims, 1 Drawing Sheet

(52) U.S. Cl.
CPC ............... *B01L 2300/0838* (2013.01); *B01L 2400/0439* (2013.01); *B01L 2400/0487* (2013.01); *G01N 2035/1034* (2013.01); *G01N 2035/1041* (2013.01)

(56) References Cited

U.S. PATENT DOCUMENTS

| | | | |
|---|---|---|---|
| 6,521,187 B1 | 2/2003 | Papen | |
| 8,726,746 B2* | 5/2014 | Wassermeier | B01L 3/0275 73/864.01 |
| 9,068,566 B2* | 6/2015 | Ivri | F04B 43/046 |
| 2004/0020942 A1* | 2/2004 | Ingenhoven | B01L 3/021 222/135 |
| 2006/0144331 A1 | 7/2006 | Hanafusa et al. | |
| 2007/0020763 A1* | 1/2007 | Ingenhoven | B01L 3/021 436/43 |
| 2007/0210677 A1* | 9/2007 | Larson | B01L 3/0268 310/338 |
| 2012/0304929 A1* | 12/2012 | Ivri | F04B 43/046 118/712 |
| 2013/0037623 A1* | 2/2013 | Yamaguchi | B01L 3/0268 239/11 |

OTHER PUBLICATIONS

International Preliminary Report on Patentability dated Apr. 28, 2015, issued in PCT Application No. PCT/IB2013/059618, filed Oct. 24, 2013.

\* cited by examiner

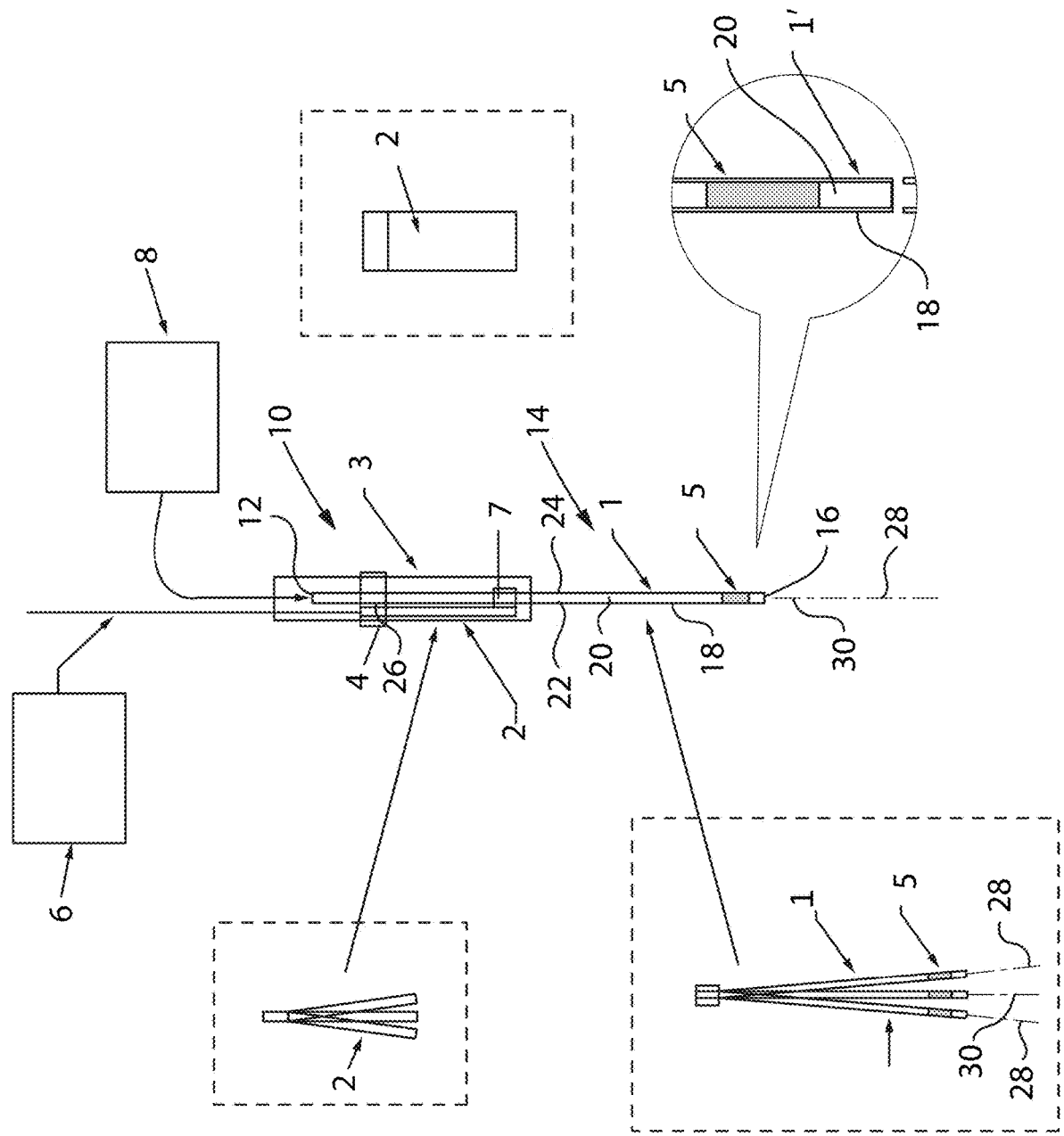

METHOD AND DEVICE FOR MEASURING AND CONTROLLING THE DOSAGE OF SMALL QUANTITIES OF FLUID BY MEANS OF A RESONATING NEEDLE, AND RESONATING NEEDLE SUITABLE FOR THIS PURPOSE

BACKGROUND OF THE INVENTION

Field of the Invention

The present invention relates to the field of systems for dosing very small quantities of fluids for analytic apparatuses, more specifically to a system for measuring and controlling the in-line dosage of small quantities of fluid by means of a resonating needle, as well as to a resonating needle suitable for this purpose.

Background Art

In advanced analytics (e.g., for laboratory analyses) and in-vitro diagnostics (IVD), the dosage of small quantities of fluid is one of the most important and critical aspects for ensuring high precision and using small quantities of product, i.e., reagent, diluting fluid or biological sample.

In the fluid dosage technique employed in advanced analytics, the term "small quantity" of fluid commonly refers to a quantity smaller than 10 microlitres.

The current fluid treatment equipment for analytic applications are based on the use of volumetric pumps, the precision of which is often affected by the impossibility of operating directly in contact with the fluid to be moved. The fluid is delivered by using a liquid acting as a carrier and a more or less large part of air.

The fluid is taken by means of a needle, often a metallic one, the length and diameter of which may vary as a function of the point of collection and the quantity of fluid to be moved.

The compressibility of the gas (air) hugely reduces the actual performance of the micropump depending on temperature and fluid variables such as viscosity and specific weight.

Measurement methods are known which are based on fluid flowmetry or weighing techniques. However, for small quantities of fluid, of the order of microlitres, it is extremely difficult to use such methods for these measurements.

In analytic applications, furthermore, fluids are characterized by extreme reactivity and viscosity changes, which may likely lead to phenomena of solidification and gas bubble formation, even in the presence of minimal pressure and temperature variations.

Small volumes of fluid (e.g., less than 4 microlitres) cannot be easily measured by means of traditional methods, because of their small mass and the difficulty in ensuring controlled delivery of such small quantities, which are difficult to manipulate, by means of volumetric pumps.

Systems are known in the art which utilize piezoelectric components as delivery-assisting tools, based on constriction of the delivery element. For example, U.S. Pat. No. 6,521,187-B1 describes a system for dispensing liquid drops, wherein a piezoelectric element shaped like a hollow cylinder surrounds a glass capillary element, thereby generating, by deformation, compressive propulsion by capillary contraction, which helps the liquid come out from the capillary itself, thus behaving as a pump. A pressure transducer external to the capillary is used for measuring the fluid to be injected through the capillary. Therefore, this system comprising a glass capillary and a hollow cylindrical piezoelectric element is not suitable for measuring fluid quantities, and suffers from the above-described problems.

SUMMARY OF THE INVENTION

It is therefore one object of the present invention to overcome all the above-mentioned drawbacks by providing a system that allows to continuously measure and monitor small fluid masses exactly at the point of collection and also during delivery and collection, with high measurement accuracy and speed.

The invention is based on the use of a metallic resonating needle for taking the fluid and measuring the mass thereof.

The needle can be seen as a beam fixed to its upper support point which, when subjected to flexural oscillation, will have a resonance frequency dependent on its rigidity and on the total oscillating mass.

In particular, resonance is attained by coupling the needle to a piezoelectric resonating element.

A resonating needle according to the present invention can be advantageously employed for measuring and controlling the in-line dosage of small quantities of a fluid, particularly in advanced analytics applications.

An object of the present invention concerns the application of the above method for measuring small volumes of fluid and to the implementation of a device integrating a piezoelectric actuator/sensor on the body of the collection needle.

An object of the present invention is a device for measuring and controlling the dosage of a small quantity of fluid, characterized in that it comprises: a needle adapted to be deformed by oscillation and to contain said small quantity of fluid; a resonating element of the piezoelectric laminar type, coupled to said needle solely for the purpose of determining said oscillation, said resonating element being adapted to be energized in order to detect variations of oscillation parameters of the needle and of the resonating element; means for controlling the supply and/or delivery of said small quantity of fluid into/from said needle; energizing and detecting means adapted to send energizing signals to said resonating element and to detect variations of oscillation parameters of the needle and of the resonating element for the purpose of controlling said supply and/or delivery control means and determining said dosage.

It is a further object of the present invention to provide a method for measuring and controlling the dosage of a small quantity of fluid, characterized in that it comprises the steps of: providing a needle adapted to be deformed by oscillation and to contain said small quantity of fluid; coupling a resonating element of the piezoelectric laminar type to said needle solely for the purpose of determining said oscillation, said resonating element being adapted to be energized in order to detect variations of oscillation parameters of the needle and of the resonating element; controlling the supply and/or delivery of said small quantity of fluid into/from said needle; energizing said resonating element and detecting variations of oscillation parameters of the needle and of the resonating element for the purpose of controlling said supply and/or delivery into/from said needle and determining said dosage.

It is yet another object of the present invention to provide a resonating needle adapted to be used in a device for measuring and controlling the dosage of a small quantity of fluid, characterized in that it comprises: a needle adapted to be deformed by oscillation and to contain said small quantity of fluid; a resonating element of the piezoelectric laminar type, coupled to said needle solely for the purpose of determining said oscillation, and adapted to be energized in order to detect variations of oscillation parameters of the needle and of the resonating element for the purpose of determining said dosage measurement and control.

It is a particular object of the present invention to provide a system for in-line measurement and control of small quantities of fluid by means of a resonating needle, and a resonating needle suitable for this purpose, as set out in the appended claims, which are an integral part of the present description.

BRIEF DESCRIPTION OF THE DRAWINGS

Further objects and advantages of the present invention will become apparent from the following detailed description of a preferred embodiment (and variants) thereof and from the annexed drawings, which are only supplied by way of non-limiting example, wherein:

FIG. 1 schematically shows an example of embodiment of the measuring device of the present invention, with frames showing enlarged parts thereof.

DETAILED DESCRIPTION OF SOME EMBODIMENTS OF THE INVENTION

FIG. 1 shows an example of embodiment of a resonating needle according to one aspect of the invention. The resonating needle essentially comprises a needle 1 and a piezoelectric resonating actuation element 2 coupled to the needle 1. As depicted in FIG. 1, needle 1 has an upper portion or first end 10 that terminates at a top 12 and a free portion or second end 14 that terminates at a tip 16. Tip 16 is disposed opposite of top 12. Needle 1 is tubular and has a sidewall 18 that encircles a channel 20 that extends from top 12 to tip 16. Sidewall 18 is depicted as having a first side 22 that extends between top 12 and tip 16 and an opposing second side 24 that extends between top 12 and tip 16.

The piezoelectric resonating actuation element 2 (also referred to herein as a resonating element) is preferably a leaf-shaped piezo-bender element positioned alongside the needle 1.

The needle 1 is stressed in order to measure its oscillation-induced deformation by using a bender-type piezoelectric material, wherein the intensity of the electric field determines the amplitude of the differential contraction between two plates, which causes inflection of the element.

A piezo-bender is a laminar piezoelectric material of the piezo-ceramic type that can be used as a sensor or as a source of vibrational mechanical energy; when coupled to a structure, it can apply vibrational mechanical stress thereto or detect the deformation thereof.

In particular, the piezo-bender used in this context is composed of two push-pull feeded laminar piezoelectric elements, contracting and elongating, which cause the needle 1 to oscillate by bending. Thus, piezoelectric resonating actuation element 2 can comprise a laminar piezoelectric bender.

The response of a piezo-ceramic material to a change in the electric field or a deformation is extremely fast, and vibrations in the kHz range can be produced or detected.

The piezoelectric resonating actuation element 2 is fixed to the upper portion 10 of the needle 1 (opposite to the needle tip 16). The fixing operation is carried out by taking into account the nature of the component and the desired effect upon the needle 1. Preferably, the fixing is done by means of a suitable glue 4 (e.g., Araldite 2014-1), which creates a strong mechanical junction with the top of the needle 1 at a first point of constraint 26. A second point of constraint 7 to the needle 1 is found at the opposite end of the piezoelectric resonating actuation element 2, e.g., by means of the same glue, in order to induce inflection thereof. Thus, as depicted in FIG. 1, resonating element 2 is disposed on first side 22 of upper portion 10 of needle 1 so that resonating element 2 does not encircle needle 1. The resonating element 2 is constrained to upper portion 10 of needle 1 at a first point of constraint 26 and at a second point of constraint 7. The second point of constraint 7 is spaced apart from the first point of constraint 26 so that resonating element 2 is not constrained to needle 1 between the first point of constraint 26 and the second point of constraint 7.

Such mutual arrangement of the needle and the piezoelectric element provides the utmost capability of detecting the oscillation frequency.

Preferably, an external protection 3 consisting of a plastic cylinder surrounds the piezoelectric element and at least that part of the needle which faces towards it.

There are also electric conductors for energizing the piezoelectric element and detection of the electric signals generated by it through the effect of the oscillation of the coupled elements, i.e., needle and piezoelectric element. Thus, resonating element 2 is operable between an energized state and a non-energized state.

The needle is normally used for taking and then releasing a very small quantity of fluid 5 (of the order of microlitres, e.g., <10 microlitres), which positions itself within the needle in the terminal part 1' thereof, i.e., in the tip area.

According to one aspect of the invention, the resonance frequency measure is strictly related to the mass of fluid present in the terminal part of the needle.

The flexural oscillation motion of the needle is regulated by an equation such as:

$$f(t)=s*k+ds/dt*b+m*ds2/dt2$$

where s is the movement of the terminal part of the needle;

k is the elastic constant of the needle, which is generally made of stainless steel having a high and stable elastic behavior.

b is the damping, m is the mass—The mass consists of the total of the mass of the needle itself and the mass of the fluid concentrated in the terminal part of the needle, f(t) is the externally applied oscillating force.

The resonance frequency fr of the needle is given by the following relation:

$$fr=0.159*(3*E*I/(mf+3/8mt)/Lc\char`^3)\char`^0.5$$

wherein

E is the Young's modulus of the needle material,

I is the inertia of the needle cross-section, mt is the distributed mass of the needle, mf is the concentrated mass corresponding to the fluid within the terminal part of the needle, Lc is the free inflection length of the needle—Actually, the piezo-bender also participates in the oscillation, although it is much more rigid than the free part of the needle. The resulting effect is that the equivalent length of the beam (as defined above) is slightly greater than the actual free length of the needle, and the experimental frequency is slightly less than that estimated with Lc.

In one example of embodiment, a conditioning and driving electronics 6 periodically subjects the needle, by means of the piezo-bender, to a flexural mechanical impulse. In response to said impulse, the needle oscillates; by measuring the oscillation frequency and amplitude, it is possible to detect the mass variations due to the presence of fluid in the terminal part of the needle itself. That is, in view of the above and as depicted in FIG. 1, resonating element 2 causes a flexural bending of needle 1 so as to move tip 16 of needle 1 when resonating element 2 is moved from the non-energized state to the energized state. More specifically, wherein when resonating element 2 is in the non-energized state, needle 1 has a central longitudinal axis 28 that extends along the length thereof and that is disposed along a fixed linear axis 30. When resonating element 2 is in the energized state, resonating element 2 causes flexural bending of needle 2 so that at least a portion of central longitudinal axis 28 of needle 1 bends away from the fixed linear axis 30. Thus, as also depicted in FIG. 1, when the resonating element 2 is moved from the non-energized state to the energized state, tip 16 of needle 1 moves laterally away from the fixed linear axis 30.

The variation of the damping induced by the characteristics of the fluid into which the needle is immersed can supply information about the viscosity of the fluid and the contact therewith.

During supply and/or delivery, the continuous measurement of the frequency variation allows the pump 8 to be adjusted for taking and/or delivering exactly the desired mass quantity of fluid.

Therefore, the piezo-bender element is not used for delivering the fluid, but for measuring its quantity, so that the external pump can deliver or take the correct quantity of fluid through the metallic needle.

The needle, preferably a capillary one, must be made of a suitable material having typical metal characteristics in terms of flexural stability, preferably stainless steel, although another material may possibly be used, provided that it has similar flexural stability characteristics. Glass or plastic would not be suitable for this purpose, since they lack such characteristics.

Considering the typical needle dimensions, it is possible to detect frequencies of the component in the range of 100 to 400 Hz, with maximum percent frequency variations of 10% due to the taking of small quantities of fluid.

The operation of the electronics is based on the alternate use of the piezo-bender element as an actuator and as a sensor.

During a period of a few hundreds of microseconds, the electronics generates the actuation impulse that induces flexure of the piezo element and the oscillatory response of the needle. Immediately afterwards, the signal generated by the piezo element through the effect of the oscillation of the needle is picked up, whose frequency and oscillation amplitude variations allow detecting the mass variations.

From the value and frequency of said signal, it is possible to derive the quantity of mass of the fluid that is participating in the component's characteristic motion.

The repetition of the test every fraction of a second allows measuring the fluid as it is being aspirated, and detecting any anomalous conditions such as duct obstruction or gas bubble formation.

The same procedure can be used at the delivery point in order to verify the progressive release of the fluid.

In another example of embodiment, the impulse-based electronics can be replaced by a continuously operating electronic system wherein the piezo-bender acts as a resonating element in the electronic circuit as well (like a quartz element in a tuned oscillator). In this case, the oscillation is continuously maintained at the resonance frequency of the mechanical part, thereby allowing a continuous measurement of mass flows.

The above-described example of embodiment may be subject to variations without departing from the protection scope of the present invention, including all equivalent designs known to a man skilled in the art.

From the above description, those skilled in the art will be able to produce the object of the invention without introducing any further construction details.

The invention claimed is:

1. A device for measuring and controlling a quantity of fluid, said device comprising:
    a needle adapted to contain a fluid, the needle comprising a first end, a second end, a tip opposite the first end, and a length that extends from the first end to the tip; and
    a resonating element disposed on one side of the first end of the needle so that the resonating element does not encircle the needle, the resonating element comprising a laminar piezoelectric bender, the resonating element being constrained to the first end of the needle at a first point of constraint and at a second point of constraint, the second point of constraint being spaced apart from the first point of constraint so that the resonating element is not constrained to the needle between the first point of constraint and the second point of constraint, the resonating element being configured to subject the needle to a flexural mechanical impulse that causes the needle to oscillate and also being configured to detect variations of oscillation parameters of the needle.

2. The device according to claim 1, wherein said needle is a capillary needle made of metallic material.

3. The device according to claim 2, wherein the metallic material comprises stainless steel.

4. The device of claim 1, wherein the resonating element is constrained to the needle at the first point of constraint by a glue.

5. The device of claim 4, wherein the resonating element is constrained to the needle at the second point of constraint by a glue.

* * * * *